United States Patent
Lippert

(10) Patent No.: US 6,655,356 B2
(45) Date of Patent: Dec. 2, 2003

(54) INTERNAL COMBUSTION ENGINE WITH FUEL INJECTION VALVES

(75) Inventor: Eduard Lippert, Calberlah (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 10/208,390

(22) Filed: Jul. 29, 2002

(65) Prior Publication Data

US 2002/0179043 A1 Dec. 5, 2002

Related U.S. Application Data

(63) Continuation of application No. PCT/EP00/13245, filed on Dec. 22, 2000.

(30) Foreign Application Priority Data

Jan. 28, 2000 (DE) .......................................... 100 03 603

(51) Int. Cl.[7] .............................................. F02M 56/02
(52) U.S. Cl. ...................................................... 123/470
(58) Field of Search ................................. 123/470, 468, 123/469; 439/130, 378

(56) References Cited

U.S. PATENT DOCUMENTS

| | | | | |
|---|---|---|---|---|
| 5,140,963 A | * | 8/1992 | Brackett et al. ............. 123/470 |
| 5,211,149 A | * | 5/1993 | DeGrace, Jr. ................ 123/470 |
| 5,350,314 A | | 9/1994 | Saba | |
| 5,354,204 A | * | 10/1994 | Hughes ........................ 439/35 |
| 5,514,009 A | * | 5/1996 | Hughes ........................ 439/35 |
| 5,598,824 A | * | 2/1997 | Treusch et al. ............. 123/470 |
| 5,607,315 A | * | 3/1997 | Bonnah et al. ............. 439/130 |
| 5,925,854 A | | 7/1999 | Sugiyama | |
| 6,457,456 B1 | * | 10/2002 | Scollard et al. ............. 123/470 |

FOREIGN PATENT DOCUMENTS

| | | |
|---|---|---|
| DE | 6901268 | 5/1969 |
| DE | 42 40 130 A1 | 6/1994 |
| DE | 197 24 165 A1 | 12/1998 |
| DE | 198 19 095 A1 | 11/1999 |
| EP | 0 565 867 A3 | 10/1993 |
| EP | 0 969 203 A1 | 1/2000 |
| JP | 08 028 394 | 1/1996 |

\* cited by examiner

Primary Examiner—Mahmoud Gimie
(74) Attorney, Agent, or Firm—Laurence A. Greenberg; Werner H. Stemer; Manfred Beck

(57) ABSTRACT

An internal combustion engine, in particular for a motor vehicle, includes a cylinder head and fuel injection valves. The cylinder head has seats for the fuel injection valves. Alignment devices on the seats and on the fuel injection valves interact with one another such that, when a fuel injection valve is accommodated in a seat, the fuel injection valve is aligned in the seat with respect to a rotation about a longitudinal axis of the fuel injection valve.

7 Claims, 2 Drawing Sheets

INTERNAL COMBUSTION ENGINE WITH FUEL INJECTION VALVES

CROSS-REFERENCE TO RELATED APPLICATIONS

This application is a continuation of copending International Application No. PCT/EP00/13245, filed Dec. 22, 2000, which designated the United States and was not published in English.

BACKGROUND OF THE INVENTION

Field of the Invention

The invention relates to an internal combustion engine having a cylinder head and injection valves for injecting fuel. The cylinder head has seats for the injection valves.

In internal combustion engines with fuel injection valves which have an asymmetrical injection jet, the relative position of the injection jet in relation to a chamber in which a fuel-air mixture is formed, such as a combustion chamber in the case of direct injection or a chamber in the inlet port, is extremely important for providing a correct fuel-air mixture. Even if the injection valve is rotated in its seat just by a minimal amount about its longitudinal axis away from an optimum position, this can result in a considerably impaired mixture formation, and hence to a corresponding deterioration in engine functions such as power output, pollutant emission and fuel consumption. During the assembly of such internal combustion engines it is therefore necessary, when inserting the injection valves into the respective seats on the cylinder head, to precisely align a position with respect to a rotation about a longitudinal axis of the injection valve. This, however, requires an increased outlay during assembly and is costly.

SUMMARY OF THE INVENTION

It is accordingly an object of the invention to provide an internal combustion engine which overcomes the above-mentioned disadvantages of the heretofore-known internal combustion engines of this general type and which results in a simplification and cost reduction in the assembly of internal combustion engines having injection valves.

With the foregoing and other objects in view there is provided, in accordance with the invention, an internal combustion engine, including:

a fuel injection valve defining a longitudinal axis;

a cylinder head with a housing having a seat for accommodating the fuel injection valve;

the seat being embodied as a first alignment device; and the fuel injection valve having a second alignment device configured to interact with the first alignment device such that, when the fuel injection valve is accommodated in the seat, the fuel injection valve is aligned in the seat with respect to a rotation about the longitudinal axis of the injection valve.

In other words, in accordance with the invention there is provided, an internal combustion engine, in particular for a motor vehicle, having a cylinder head and injection valves for fuel, seats for each of the injection valves being provided in the housing of the cylinder head, wherein devices directly formed by the seats and interacting with a respective injection valve are configured such that when accommodating the injection valve in the seat, an alignment of the injection valve in the seat is predetermined with respect to rotation about a longitudinal axis of the injection valve.

This has the advantage that in the case of injection valves with an asymmetrical injection jet, a desired, optimum position of the injection jet in relation to the combustion chamber (in the case of direct injection) or in relation to a mixture formation chamber in an inlet port (in the case of inlet manifold injection) is automatically ensured when inserting the injection valve into the seat on the cylinder head, wherein no additional adjustments are required for this purpose. This greatly simplifies the assembly of the internal combustion engine.

According to another feature of the invention, the first alignment device and the second alignment device interact mechanically with one another.

For example, the seats and the fuel injection valves are arranged in such a way that fuel is injected directly into the respective combustion chambers of the cylinders of the internal combustion engine.

According to a preferred embodiment, the interacting alignment devices include a fin on the injection valve and a matching slot at the seat. The fin is for example formed on an arm for a connector system. The arm can be formed as a radial arm and the connector system can be a plug connector for connecting the injection valve to a fuel injection valve controller.

According to another feature of the invention, the cylinder head has a flange, in which the seats for injection valves are at least partially formed.

Other features which are considered as characteristic for the invention are set forth in the appended claims.

Although the invention is illustrated and described herein as embodied in an internal combustion engine having injection valves, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
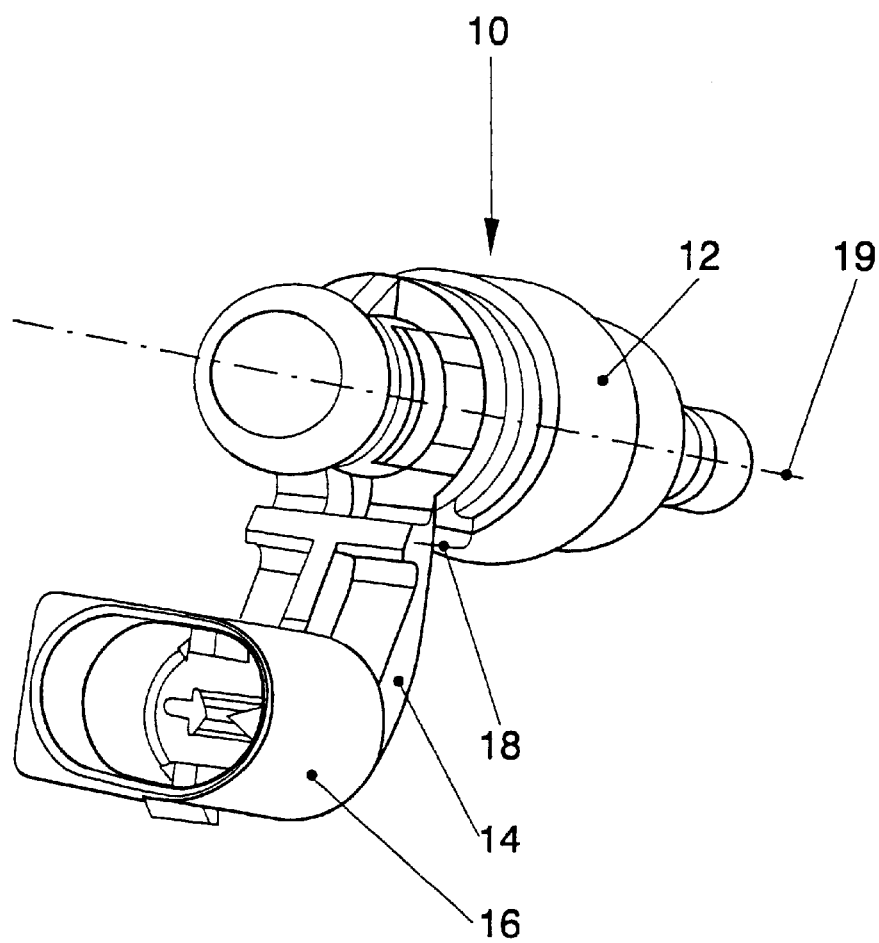
FIG. 1 is a perspective view of an injection valve for an internal combustion engine according to the invention.

Referring now to the figures of the drawings in detail and first, particularly, to FIG. 1 thereof, there is shown an injection valve 10 which includes a valve body 12 and an arm 14 for a connector system 16 for connecting a fuel injection valve controller 38. A fin 18 is integrally formed on this arm 14. Reference numeral 19 denotes a longitudinal axis of the injection valve.

Figure 2:
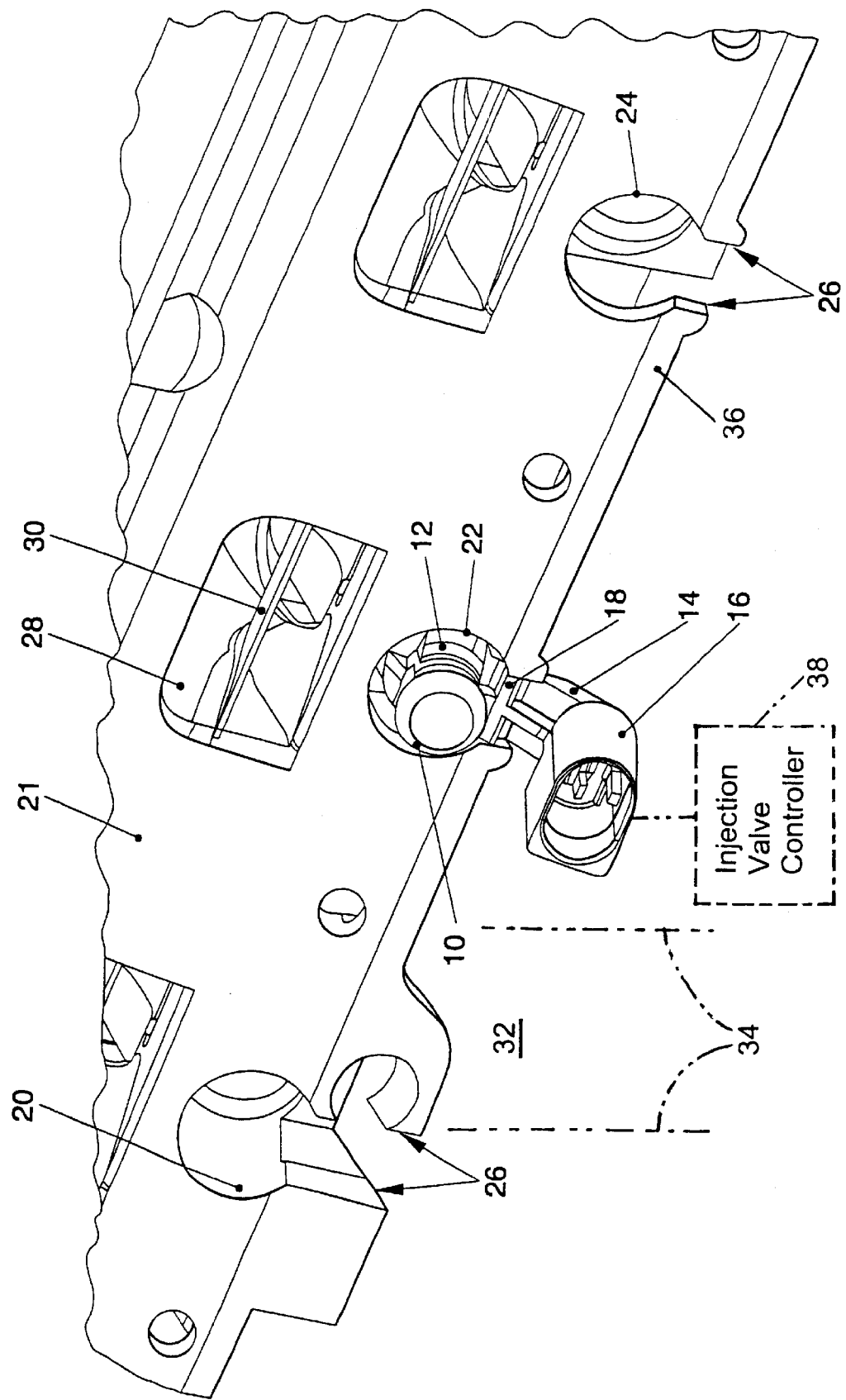
FIG. 2 is a perspective view of a part of a cylinder head of an internal combustion engine according to the invention.

The cylinder head 21 shown in FIG. 2 is configured for an internal combustion engine with direct injection and includes a plurality of locating receptacles or seats 20, 22, 24, for each of the injection valves, together with an inlet port 28 having an integrally cast tumble plate 30. The injection valves 10 inject the fuel directly into a combustion chamber 32 in a cylinder 34 of the internal combustion engine. The cylinder 34 is only schematically indicated with dash-dotted lines.

The seats 20, 22, 24 each have a slot 26, which is configured to match or fit the fin 18 of the injection valve 10. The slots 26 of the seats 22, 24 are formed in a flange 36 of the cylinder head 21. An injection valve 10 is inserted into the seat 22. The illustration of FIG. 2 makes it clear that the fin 18 and the slot 26 interact mechanically in such a way that a position or an alignment of the injection valve 10 in the seat 22 is predetermined with respect to rotation about the longitudinal axis 19. For this purpose the fin 18 fits precisely into the slot 26, so that it is not possible either to insert the injection valve 10 into the seat 22 such that the injection valve is incorrectly aligned, or to rotate the injection valve 10 once it has been inserted into the seat 22. The connector system 16, which is embodied as a plug connector, is connected to a controller 38 for controlling the injection valves 10.

I claim:

1. An internal combustion engine, comprising:

a fuel injection valve defining a longitudinal axis;

a cylinder head with a housing having a seat for accommodating said fuel injection valve;

said seat being embodied as a first alignment device; and said fuel injection valve having a second alignment device configured to interact with said first alignment device such that, when said fuel injection valve is accommodated in said seat, said fuel injection valve is aligned in said seat with respect to a rotation about the longitudinal axis of said injection valve.

2. The internal combustion engine according to claim 1, wherein said first alignment device and said second alignment device are mechanically interacting devices.

3. The internal combustion engine according to claim 1, including:

a cylinder having a combustion chamber formed therein; and said seat and said fuel injection valve being disposed such that said fuel injection valve injects fuel directly into said combustion chamber of said cylinder.

4. The internal combustion engine according to claim 1, wherein:

said seat has a slot formed therein as said first alignment device; and said fuel injection valve has a fin as said second alignment device, said fin being configured to match said slot.

5. The internal combustion engine according to claim 4, wherein:

said fuel injection valve includes a connector system configured to be connected to a fuel injection valve controller; and said connector system includes an arm, said fin is formed on said arm.

6. The internal combustion engine according to claim 1, wherein said housing of said cylinder head has a flange, said seat for accommodating said fuel injection valve is at least partially formed in said flange.

7. The internal combustion engine according to claim 1, wherein said cylinder head is a motor vehicle cylinder head.

* * * * *